(12) United States Patent  (10) Patent No.: US 9,319,625 B2
Yaguchi et al.  (45) Date of Patent: Apr. 19, 2016

(54) CONTENT TRANSFER SYSTEM AND COMMUNICATION TERMINAL

(75) Inventors: Yoshiharu Yaguchi, Kanagawa (JP); Kenichi Toshimitsu, Kanagawa (JP)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 889 days.

(21) Appl. No.: 13/030,197

(22) Filed: Feb. 18, 2011

(65) Prior Publication Data

US 2011/0316671 A1 Dec. 29, 2011

Related U.S. Application Data

(60) Provisional application No. 61/358,731, filed on Jun. 25, 2010.

(51) Int. Cl.
*G05B 19/00* (2006.01)
*H04N 5/765* (2006.01)
*H04N 5/782* (2006.01)
*H04N 21/234* (2011.01)
*H04N 21/258* (2011.01)
*H04N 21/274* (2011.01)
*H04N 21/41* (2011.01)
*H04N 21/414* (2011.01)
*H04N 21/4223* (2011.01)
*H04N 21/433* (2011.01)
*H04N 21/472* (2011.01)
*H04N 21/482* (2011.01)
(Continued)

(52) U.S. Cl.
CPC ............... *H04N 5/765* (2013.01); *H04N 5/782* (2013.01); *H04N 21/23418* (2013.01); *H04N 21/25875* (2013.01); *H04N 21/274* (2013.01); *H04N 21/4126* (2013.01); *H04N 21/41407* (2013.01); *H04N 21/4223* (2013.01); *H04N 21/4334* (2013.01); *H04N 21/47214* (2013.01); *H04N 21/4826* (2013.01); *H04N 21/6581* (2013.01); *H04N 21/6582* (2013.01); *G06F 21/00* (2013.01); *G06F 21/30* (2013.01); *G06F 21/32* (2013.01); *G11B 20/00137* (2013.01); *G11B 20/00862* (2013.01); *G11B 20/00869* (2013.01)

(58) Field of Classification Search
USPC ........ 340/5.53; 705/51, 26, 32; 709/229, 217, 709/200
See application file for complete search history.

(56) References Cited

U.S. PATENT DOCUMENTS 6,021,212 A * 2/2000 Ho .................... G06F 21/32
340/5.53
6,282,649 B1 * 8/2001 Lambert ............ G06F 21/6218
380/277

(Continued)

FOREIGN PATENT DOCUMENTS

JP 2006-229792 8/2006

*Primary Examiner* — Fekadeselassie Girma
*Assistant Examiner* — Rufus Point
(74) *Attorney, Agent, or Firm* — Oblon, McClelland, Maier & Neustadt, L.L.P.

(57) ABSTRACT

A communication terminal including an interface that receives an input requesting a reservation to record content; a control unit that acquires image data corresponding to a user of the communication terminal; a recording reservation unit that generates recording reservation information based on the input and the image data; and a communication unit that transmits the recording reservation information to a server, and receives, from the server, content based on the recording reservation information.

21 Claims, 10 Drawing Sheets

(51) Int. Cl.
*H04N 21/658* (2011.01)
*G06F 21/30* (2013.01)
*G06F 21/32* (2013.01)
*G06F 21/00* (2013.01)
*G11B 20/00* (2006.01)

(56) References Cited

U.S. PATENT DOCUMENTS

| | | | | |
|---|---|---|---|---|
| 6,438,594 B1* | 8/2002 | Bowman-Amuah | G06F 9/4428 | 709/203 |
| 6,496,936 B1* | 12/2002 | French | G06F 21/31 | 340/5.81 |
| 6,735,695 B1* | 5/2004 | Gopalakrishnan | G06F 21/32 | 713/186 |
| 6,865,555 B2* | 3/2005 | Novak | G06Q 20/3821 | 348/E7.071 |
| 7,058,685 B1* | 6/2006 | van Zee | G06Q 10/107 | 358/402 |
| 7,191,238 B2* | 3/2007 | Uchida | G06F 21/10 | 382/115 |
| 7,483,859 B2* | 1/2009 | Blackson | G06Q 20/04 | 705/43 |
| 7,624,417 B2* | 11/2009 | Dua | H04L 29/06027 | 725/114 |
| 7,881,656 B2* | 2/2011 | Khedouri | G06F 17/30094 | 455/3.01 |
| 7,899,210 B2* | 3/2011 | Dorai | G06F 21/32 | 340/506 |
| 8,160,307 B2* | 4/2012 | Polcha | G06K 9/00013 | 340/5.52 |
| 8,473,991 B2* | 6/2013 | Hao | H04N 21/2747 | 725/115 |
| 8,515,990 B2* | 8/2013 | Lee | G06F 17/3084 | 707/705 |
| 8,572,659 B2* | 10/2013 | Fyock | H04N 5/76 | 386/291 |
| 8,620,772 B2* | 12/2013 | Owen | H04W 4/001 | 705/26.62 |
| 2001/0026632 A1 | 10/2001 | Tamai | G06K 9/00 | 382/116 |
| 2001/0027520 A1* | 10/2001 | Mori | G06Q 20/40 | 713/186 |
| 2001/0035814 A1* | 11/2001 | Uchida | G06F 21/10 | 340/5.74 |
| 2001/0044747 A1* | 11/2001 | Ramachandran | G06Q 20/04 | 705/16 |
| 2002/0012445 A1* | 1/2002 | Perry | G06Q 10/00 | 382/100 |
| 2002/0013771 A1* | 1/2002 | Blackson | G06Q 20/04 | 705/43 |
| 2002/0031230 A1* | 3/2002 | Sweet | H04L 63/0428 | 380/278 |
| 2002/0069263 A1* | 6/2002 | Sears | G06F 9/445 | 709/218 |
| 2002/0124190 A1* | 9/2002 | Siegel | H04L 63/0861 | 726/3 |
| 2002/0162031 A1* | 10/2002 | Levin | H04L 63/0861 | 726/7 |
| 2002/0174348 A1* | 11/2002 | Ting | G06F 21/32 | 713/186 |
| 2003/0050062 A1* | 3/2003 | Chen | H04L 29/06027 | 455/435.1 |
| 2003/0051173 A1* | 3/2003 | Krueger | G06F 21/32 | 726/21 |
| 2003/0054810 A1* | 3/2003 | Chen | H04L 12/5895 | 455/422.1 |
| 2003/0061607 A1* | 3/2003 | Hunter | B82Y 10/00 | 725/32 |
| 2003/0217007 A1* | 11/2003 | Fukushima | G06Q 30/06 | 705/51 |
| 2004/0030930 A1* | 2/2004 | Nomura | G06F 21/00 | 726/5 |
| 2004/0107435 A1* | 6/2004 | Anzai | H04N 7/17318 | 725/35 |
| 2004/0153649 A1* | 8/2004 | Rhoads | G06F 17/241 | 713/176 |
| 2004/0257196 A1* | 12/2004 | Kotzin | G07C 9/00142 | 340/5.52 |
| 2004/0263314 A1* | 12/2004 | Dorai | G06F 21/32 | 340/5.2 |
| 2005/0226468 A1* | 10/2005 | Deshpande | H04M 1/66 | 382/115 |
| 2005/0286746 A1* | 12/2005 | Silvester | G06F 21/32 | 382/116 |
| 2006/0008150 A1* | 1/2006 | Zhao | G06K 9/00288 | 382/190 |
| 2006/0031289 A1* | 2/2006 | Experton | G06F 9/4843 | 709/204 |
| 2006/0104483 A1* | 5/2006 | Harel | G07C 9/00158 | 382/115 |
| 2006/0120607 A1* | 6/2006 | Lev | G06K 9/00624 | 382/217 |
| 2006/0177061 A1* | 8/2006 | Orsini | G06F 21/606 | 380/268 |
| 2006/0271791 A1* | 11/2006 | Novack | G06K 9/00577 | 713/186 |
| 2007/0052517 A1* | 3/2007 | Bishop | G06Q 20/10 | 340/5.2 |
| 2007/0073799 A1* | 3/2007 | Adjali | H04W 28/06 | 709/200 |
| 2007/0140532 A1* | 6/2007 | Goffin | G06K 9/00288 | 382/118 |
| 2007/0271518 A1* | 11/2007 | Tischer | H04H 60/31 | 715/744 |
| 2008/0008173 A1* | 1/2008 | Kanevsky | H04L 63/0861 | 370/389 |
| 2008/0117053 A1* | 5/2008 | Maloney | G08B 13/1427 | 340/572.4 |
| 2008/0162666 A1* | 7/2008 | Ebihara | H04L 67/06 | 709/217 |
| 2008/0235808 A1* | 9/2008 | Gutta | G06F 21/10 | 726/28 |
| 2008/0240702 A1* | 10/2008 | Wassingbo | G11B 27/105 | 396/310 |
| 2008/0243861 A1* | 10/2008 | Wassingbo | G06F 17/30047 | |
| 2008/0248779 A1* | 10/2008 | Tsui | H02J 7/0055 | 455/408 |
| 2008/0250452 A1* | 10/2008 | Iwamoto | H04H 20/93 | 725/39 |
| 2009/0061901 A1* | 3/2009 | Arrasvuori | G06Q 30/00 | 455/456.3 |
| 2009/0094518 A1* | 4/2009 | Lawther | G06F 3/04817 | 715/716 |
| 2009/0133051 A1* | 5/2009 | Hildreth | H04N 5/4403 | 725/28 |
| 2009/0141950 A1* | 6/2009 | Ryu | G06F 17/30259 | 382/118 |
| 2009/0146779 A1* | 6/2009 | Kumar | G06K 9/00885 | 340/5.31 |
| 2009/0251619 A1* | 10/2009 | Seidel | H04N 5/4403 | 348/734 |
| 2009/0315670 A1* | 12/2009 | Naressi | G06F 21/10 | 340/5.8 |
| 2009/0317065 A1* | 12/2009 | Fyock | H04N 5/76 | 386/200 |
| 2010/0014840 A1* | 1/2010 | Nagai | H04H 60/45 | 386/224 |
| 2010/0027915 A1* | 2/2010 | Heins | G06Q 30/06 | 382/305 |
| 2010/0094897 A1* | 4/2010 | Sumrall | G06F 17/30743 | 707/769 |
| 2010/0146601 A1* | 6/2010 | Bunch | G06F 21/10 | 726/6 |
| 2010/0242102 A1* | 9/2010 | Cross | G06F 21/32 | 726/7 |
| 2010/0245035 A1* | 9/2010 | Jeon | G08B 13/19697 | 340/5.8 |
| 2010/0325218 A1* | 12/2010 | Castro | G06Q 50/01 | 709/206 |
| 2011/0138416 A1* | 6/2011 | Kang | G06F 3/0482 | 725/39 |

(56) References Cited

U.S. PATENT DOCUMENTS

| | | | | |
|---|---|---|---|---|
| 2011/0154385 A1* | 6/2011 | Price | | H04H 60/45 725/12 |
| 2011/0211739 A1* | 9/2011 | Eckhoff | | G06Q 30/02 382/118 |
| 2011/0216153 A1* | 9/2011 | Tasker | | H04N 7/147 348/14.02 |
| 2011/0316671 A1* | 12/2011 | Yaguchi | | H04N 21/6582 340/5.83 |
| 2012/0113273 A1* | 5/2012 | Rothschild | | H04N 1/00244 348/207.1 |

* cited by examiner

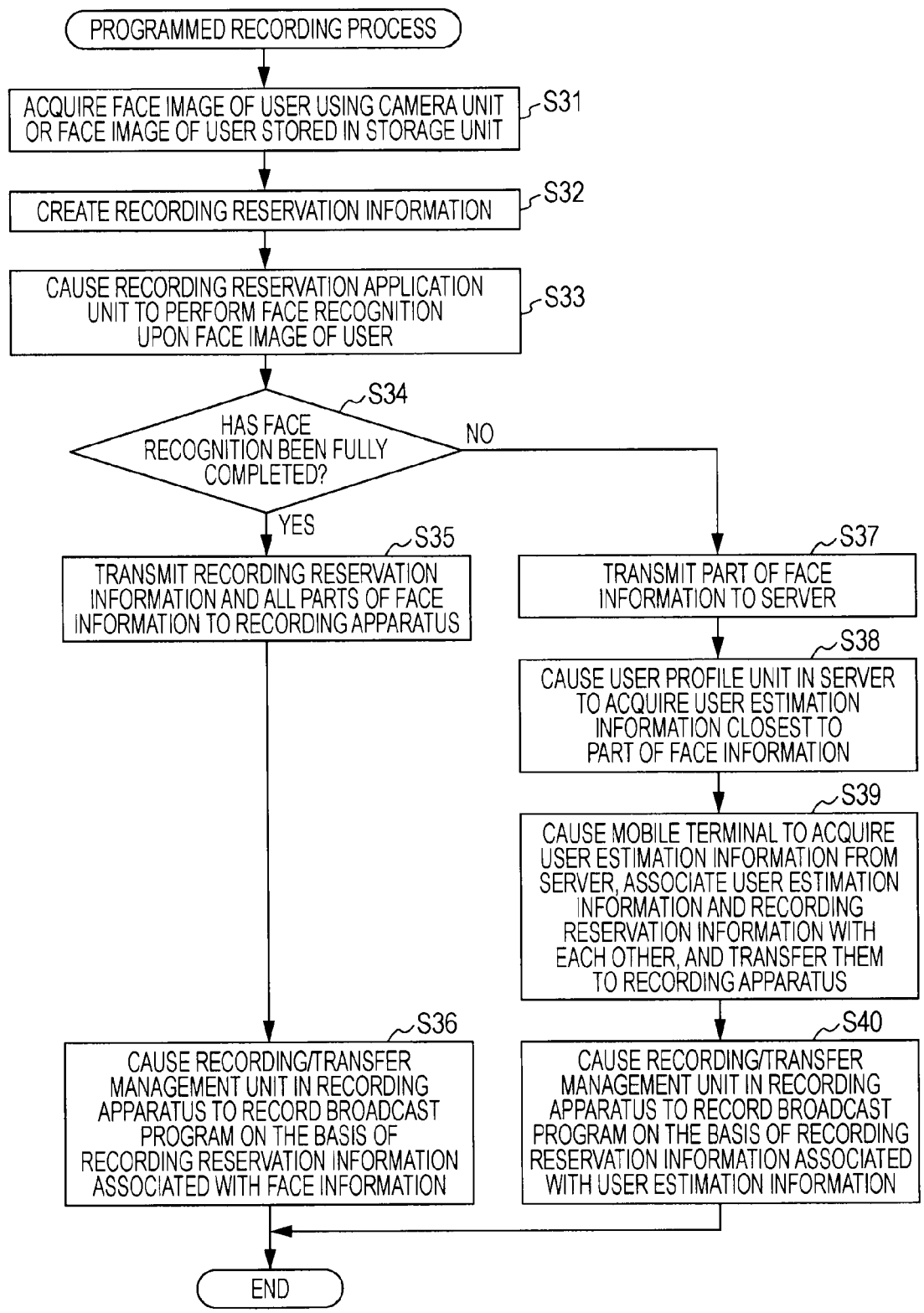

CONTENT TRANSFER SYSTEM AND COMMUNICATION TERMINAL

CROSS REFERENCE TO RELATED APPLICATION

This application claims the benefit of priority of Provisional Application Ser. No. 61/358,731, filed Jun. 25, 2010, the entire contents of which is incorporated herein by reference.

BACKGROUND OF THE INVENTION

1. Field of the Invention

The present invention relates to content transfer systems and electronic apparatuses, and, more particularly, to a technique for transferring content corresponding to the hobby and preference of a user of a communication terminal such as a mobile telephone from an external apparatus to an electronic apparatus.

2. Description of the Related Art

With the spread of a dubbing function for digital television broadcasting, transferring digital content from a recording apparatus such as an HDD recorder to a plurality of mobile terminals has been desired. Some of recording apparatuses create a database of information about the last transfer and information about the last reproduction at the time of connection to a mobile terminal, analyze these pieces of information, and automatically transfer digital content corresponding to the hobby and preference of a specific user of the mobile terminal. However, when such a recording apparatus transfers digital content for the first time, it is difficult for the recording apparatus to identify the user of a mobile terminal and automatically transfer digital content corresponding to the hobby and preference of the user.

A technique has been proposed for causing a user to manually input the identification information of the user into a recording apparatus with a remote controller at the time of recording reservation or the connection between the recording apparatus and a mobile terminal (see, for example, Japanese Unexamined Patent Application Publication No. 2006-229792.)

SUMMARY OF THE INVENTION

However, the technique described in Japanese Unexamined Patent Application Publication No. 2006-229792 does not achieve an automatic transfer function of automatically transferring digital content corresponding to the hobby and preference of a user at the first transfer. If a mobile terminal is shared among a plurality of users, it is difficult to transfer digital content corresponding to the hobby and preference of each of the users since an automatic transfer database is associated with each mobile terminal.

Many recording apparatuses for transferring recorded digital content to a mobile terminal are commercially available, and an increasing number of users view transferred digital content with a mobile terminal in, for example, a train. Some of these recording apparatuses can automatically transfer digital content corresponding to the hobby and preference of a user. However, if such a recording apparatus performs the first transfer or a mobile terminal is shared among a plurality of users, it is difficult for the recording apparatus to specify the mobile terminal and each of the users and automatically transfer digital content corresponding to the hobby and preference of each of the user.

It is desirable to provide a technique for transferring content corresponding to the hobby and preference of each user to a communication terminal such as a mobile terminal without misidentifying the user.

According to a first exemplary embodiment, the invention is directed to a communication terminal comprising: an interface configured to receive an input requesting a reservation to record content; a control unit that acquires image data corresponding to a user of the communication terminal; a recording reservation unit that generates recording reservation information based on the input and the image data; and a communication unit that transmits the recording reservation information to a server, and receive, from the server, content based on the recording reservation information.

The communication terminal may also include a camera unit configured to capture the image data corresponding to the user, which is acquired by the control unit, and/or a memory configured to store the image data corresponding to the user, which is acquired by the control unit.

The recording reservation information unit may be configured to perform facial recognition on the image data; determine whether all parts of face information have been detected by the facial recognition; and/or associate all parts of the face information with the recording reservation information when it is determined that all parts of the face information have been detected by the facial recognition; and/or associate only a part of the face information with the recording reservation information when it is determined that only a part of the face information has been detected by the facial recognition.

According to another exemplary embodiment, the present invention is directed to a computer-readable recording medium including computer program code, which when executed by a communication terminal apparatus, causes the communication terminal apparatus to perform a method comprising: receiving an input requesting a reservation to record content; acquiring image data corresponding to a user of the communication terminal; generating recording reservation information based on the input and the image data; transmitting the recording reservation information to a server; and receiving, from the server, content based on the recording reservation information.

The method may further include performing facial recognition on the image data; determining whether all parts of face information have been detected by the facial recognition; and/or associating all parts of the face information with the recording reservation information when it is determined that all parts of the face information have been detected; and/or associating only a part of the face information with the recording reservation information when it is determined that only a part of the face information has been detected.

According to another exemplary embodiment, the present invention is directed to a server comprising: a database configured to associate content with first image data corresponding to a person; a communication unit configured to receive second image data of a person acquired by a communication terminal; a transfer management unit configured to identify content to be transferred to the communication terminal based on the first image data and the second image data, wherein the communication unit is configured to transmit the identified content to the communication terminal.

The first and second image data may each correspond to face information of a person.

The transfer management may be configured to perform facial recognition on the second image data and compare the first image data and the second image data to identify the content to be transferred to the communication terminal.

The server may also include a user profile generating unit configured to generate an estimated user profile when the transfer management unit compares the first image data and second image data and determines that the second image data is incomplete or does not directly correspond to the first image data.

The transfer management unit may be configured to identify content to be transferred to the communication terminal based on the estimated user profile; and/or may be configured to associate the content stored in the database with the first image data based on a reservation request received from a communication terminal including the first image data and identifying the content as content to be recorded.

According to another exemplary embodiment, the present invention is directed to a computer-readable medium including computer program code, which when executed by a server, causes the server to perform a method comprising: associating content with first image data corresponding to a person; receiving second image data of a person acquired by a communication terminal; identifying content to be transferred to the communication terminal based on the first image data and the second image data; and transmitting the identified content to the communication terminal.

The method may include performing facial recognition on the second image data; and/or comparing a result of the facial recognition to the first image data to identify the content to be transferred to the communication terminal.

The method may further include generating an estimated user profile when a comparison of the first image data and second image data indicates that the second image data is incomplete or does not directly correspond to the first image data; and/or identifying content to be transferred to the communication terminal based on the estimated user profile.

BRIEF DESCRIPTION OF THE DRAWINGS

FIG. 10 is a flowchart illustrating a programmed recording process according to the third embodiment.

DESCRIPTION OF THE PREFERRED EMBODIMENTS

Embodiments of the present invention will be described below with reference to the accompanying drawings in the following order: 1. First Embodiment (a recording reservation application unit is included in a server); 2. Second Embodiment (a recording reservation application unit is included in a mobile terminal); 3. Third Embodiment (a content transfer system includes a mobile terminal, a recording apparatus, and a server); and 4. Others.

<1. First Embodiment>

[Overview of Content Transfer System]

A content transfer system according to the first embodiment will be described. A content transfer system according to the first embodiment has a function of automatically transferring content from an external apparatus to a mobile terminal on the basis of a result of face recognition performed with a camera installed in the mobile terminal.

A content transfer system according to the first embodiment performs face recognition with the camera function of a mobile terminal and performs the following two processes: (1) A process of associating the face image (face data) of a user with recording reservation information and transferring them to an external apparatus at the time of recording reservation or user registration; and (2) A process of specifying the user of a mobile terminal by performing face recognition with the camera function of the mobile terminal and automatically transferring content corresponding to the hobby and preference of the user from an external apparatus to the mobile terminal. As a result, even in a case where the first transfer is performed and a mobile terminal is shared among a plurality of users, it is possible to specify each of the users and automatically transfer content corresponding to the hobby and preference of each of the users.

[Entire Configuration of Content Transfer System]

Figure 1:
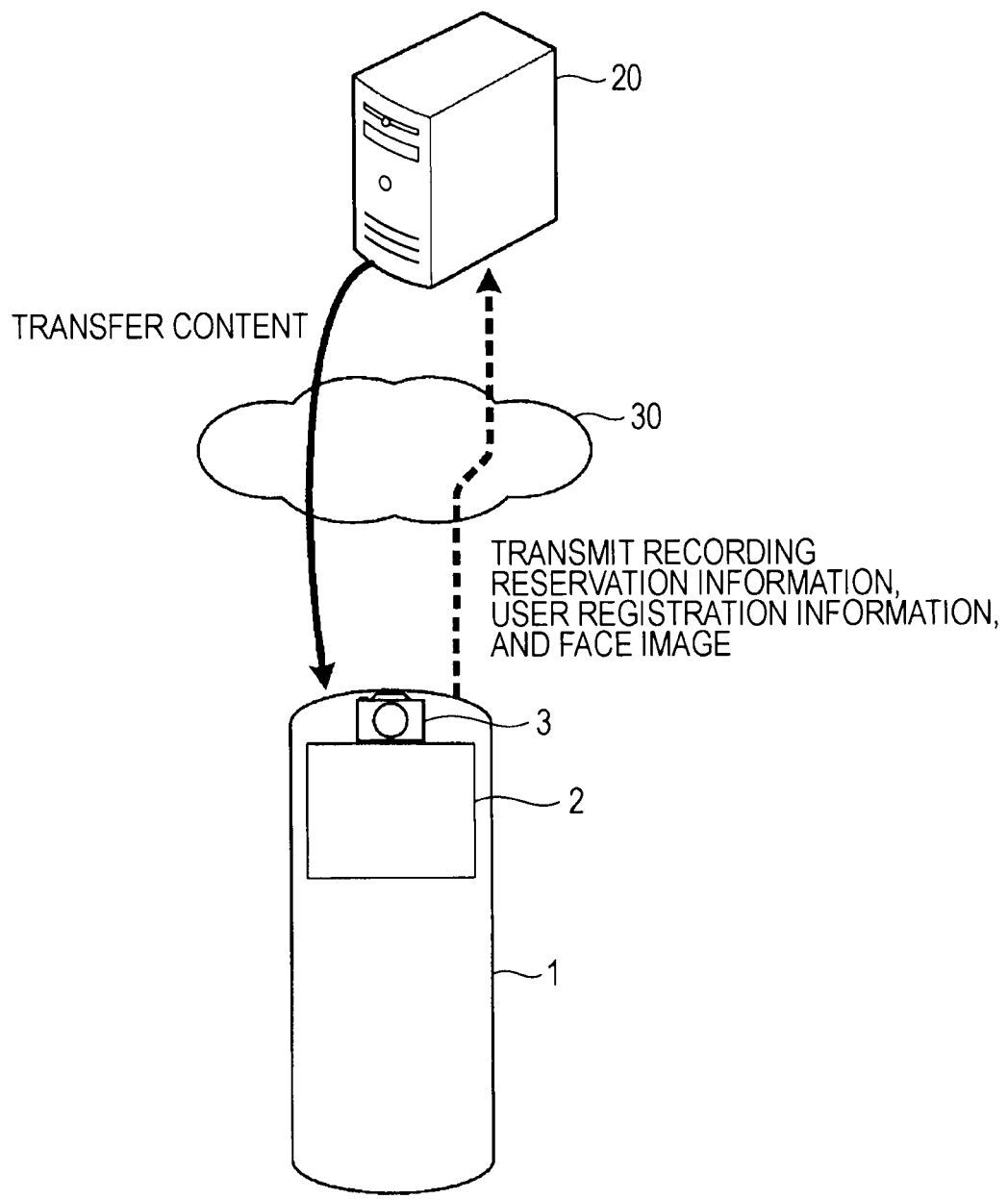
FIG. 1 is a diagram illustrating the entire configuration of a content transfer system according to a first embodiment of the present invention.

FIG. 1 is a diagram illustrating the entire configuration of a content transfer system according to the first embodiment. A content transfer system 100 includes a mobile terminal 1 (an example of a communication terminal) having a camera function and a server 20 storing content. The mobile terminal 1 and the server 20 are connected to each other via a mobile telephone network and/or a telecommunication line 30 such as the Internet.

In the content transfer system 100, the mobile terminal 1 is used as a remote controller at the time of recording reservation. At the time of recording reservation, the mobile terminal 1 associates the face image of a user with recording reservation information using a camera function (a camera unit 3) and transfers them to the server 20. In order to allow the mobile terminal 1 to receive from the server 20 content other than content that has been subjected to programmed recording, the face image of a user is transmitted from the mobile terminal 1 to the server 20 for user registration before the transfer of content.

When the mobile terminal 1 is connected to the server 20, the server 20 specifies the user of the mobile terminal 1 with a face recognition function on the basis of the face data transmitted from the mobile terminal 1 and transfers content to the mobile terminal 1 in consideration of the recording reservation state and content transfer history of the specified user. The user can view the transferred content on a display unit 2 that is, for example, a liquid crystal panel.

The user of the mobile terminal 1 may not be the owner of the mobile terminal 1 but a person who performs recording reservation with the mobile terminal 1, performs the connection between the mobile terminal 1 and the server 20 (to be described later), or transmits a content transfer request to the server 20 with the mobile terminal 1.

Although an exemplary case in which face data obtained with a camera function is transferred has been described, any method capable of obtaining the face image of a user who performs recording reservation or user registration may be used. Accordingly, instead of a face image captured with the camera function of the mobile terminal 1 at the time of recording reservation or user registration, a face image captured in the past by the mobile terminal 1 or another image capturing apparatus may be used. The mobile terminal 1 according to the first embodiment may not necessarily have a camera function.

[Internal Configuration of Mobile Terminal and Server]

Figure 2:
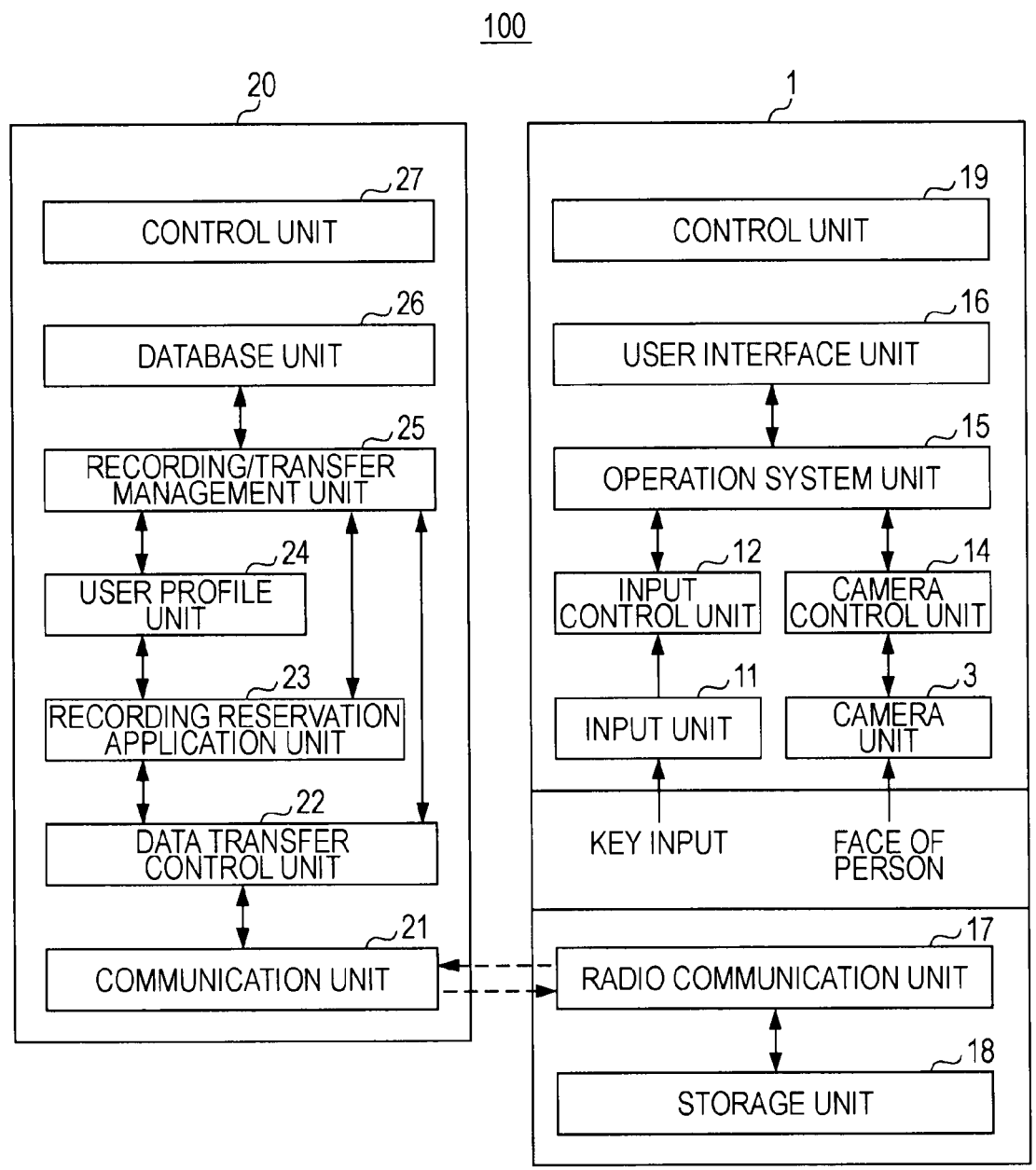
FIG. 2 is a block diagram illustrating the internal configurations of a mobile terminal according to the first embodiment and a server according to the first embodiment.

FIG. 2 is a block diagram illustrating the internal configurations of the mobile terminal 1 and the server 20. First, the internal configuration of the mobile terminal 1 will be described. The mobile terminal 1 has an input function and a camera function, and includes an operation system unit 15, a user interface unit 16, a radio communication unit 17, a storage unit 18, and a control unit 19.

The input function (an example of an input unit) is achieved by an input unit 11 for receiving a user's operation and an input control unit 12 for generating an input signal in accordance with a user's operation received by the input unit 11. The input unit 11 and the input control unit 12 are hereinafter also collectively referred to as an input unit.

The camera function (an example of an image capturing unit) is achieved by the camera unit 3 for capturing the face image of a user and a camera control unit 14 for generating the face image (face data) captured by the camera unit 3. The camera unit 3 and the camera control unit 14 are hereinafter also collectively referred to as a camera unit.

The user interface unit 16 performs display control for the display unit 2 that is, for example, a liquid crystal panel in accordance with an input signal transmitted from the input control unit 12 via the operation system unit 15, and performs display control so that a face image transmitted from the camera control unit 14 via the operation system unit 15 is displayed on the display unit 2.

The radio communication unit 17 is an example of a communication unit, and controls radio communication performed via a mobile telephone network. The mobile terminal 1 is connected to the mobile telephone network via the radio communication unit 17, and is further connected to the server 20 via the mobile telephone network and/or a telecommunication line such as the Internet.

The storage unit 18 is a nonvolatile recording medium (an example of a storage unit.) For example, a semiconductor memory such as a flash memory can be used as the storage unit 18. The storage unit 18 stores data of a face image captured by the camera unit 3 and data of content received from the server 20.

The control unit 19 controls each unit in the mobile terminal 1, and is, for example, a Micro Processing Unit (MPU.) For example, when a user performs recording reservation by operating the input unit 11 in the mobile terminal 1, the control unit 19 generates recording reservation information for a broadcast program on the basis of an input signal that is generated by the input unit 11 in accordance with a user's operation. Furthermore, the control unit 19 creates information for user registration.

Next, the internal configuration of the server 20 will be described. The server 20 includes a communication unit 21, a data transfer control unit 22, a recording reservation application unit 23, a user profile unit 24, a recording/transfer management unit 25, a database unit 26, and a control unit 27.

The communication unit 21 controls communication with a telecommunication line such as the Internet. The server 20 is connected to, for example, the Internet via the communication unit 21, and is further connected to the mobile terminal 1 via the Internet and/or a mobile telephone network.

The data transfer control unit 22 controls data transfer between the server 20 and the mobile terminal 1, and determines whether a connection request, recording reservation information, or a content transfer request has been transmitted to the server 20. The data transfer control unit 22 transmits face data, recording reservation information, or a content transfer request which has been received by the communication unit 21 to the recording reservation application unit 23 or the recording/transfer management unit 25. Furthermore, the data transfer control unit 22 transmits content transferred from the recording/transfer management unit 25 to the communication unit 21.

The recording reservation application unit 23 is an example of each of a recording reservation unit and an authentication unit, and determines whether a recording reservation based on recording reservation information transmitted from the mobile terminal 1 has been obtained and face information for specifying a user has been obtained from face data transmitted from the mobile terminal 1 using a face recognition function (an image recognition technique.) When the recording reservation application unit 23 has detected all parts of face information of a user, the recording reservation application unit 23 notifies the recording/transfer management unit 25 of the fact. On the other hand, when the recording reservation application unit 23 has detected only a part of the face information of a user, the recording reservation application unit 23 notifies the user profile unit 24 of the fact. The recording reservation application unit 23 does not operate when recording reservation is not performed. Here, the face information is user information extracted with an image recognition technique in the related art, that is, information indicating face characteristics including the shape and position of each part of a face of a user and the hairstyle of the user with which the face of the user can be identified. Instead of using a face image as face data, a characteristic parameter extracted from the face image may be used as face data. In the first embodiment, the recording reservation application unit 23 has a face recognition function. However, the control unit 27 or the mobile terminal 1 may have the face recognition function.

The user profile unit 24 refers to a user estimation database on the basis of face information transmitted from the recording reservation application unit 23 or the recording/transfer management unit 25 and obtains user estimation information closest to the face information. Here, the user estimation information is user information (an example of user attribute information) indicating a user's attribute estimated with an image recognition technique. In an exemplary face recognition technique, attributes such as a gender and an age are estimated from a face image. In the first embodiment, the user estimation information includes "estimated gender information" and "estimated age information". Profile information to be described later is extracted on the basis of the user estimation information.

The user profile unit 24 specifies corresponding profile information in the profile information database on the basis of the obtained user estimation information. The profile information includes user information and content information corresponding to the user information. In the first embodiment, the profile information includes pieces of information about "age", "gender", and "content corresponding to a target user." A plurality of pieces of profile information are registered in advance in the profile information database. User information and content information may be stored with specific user information recognized with face information and recording reservation information (content.)

Figure 3:
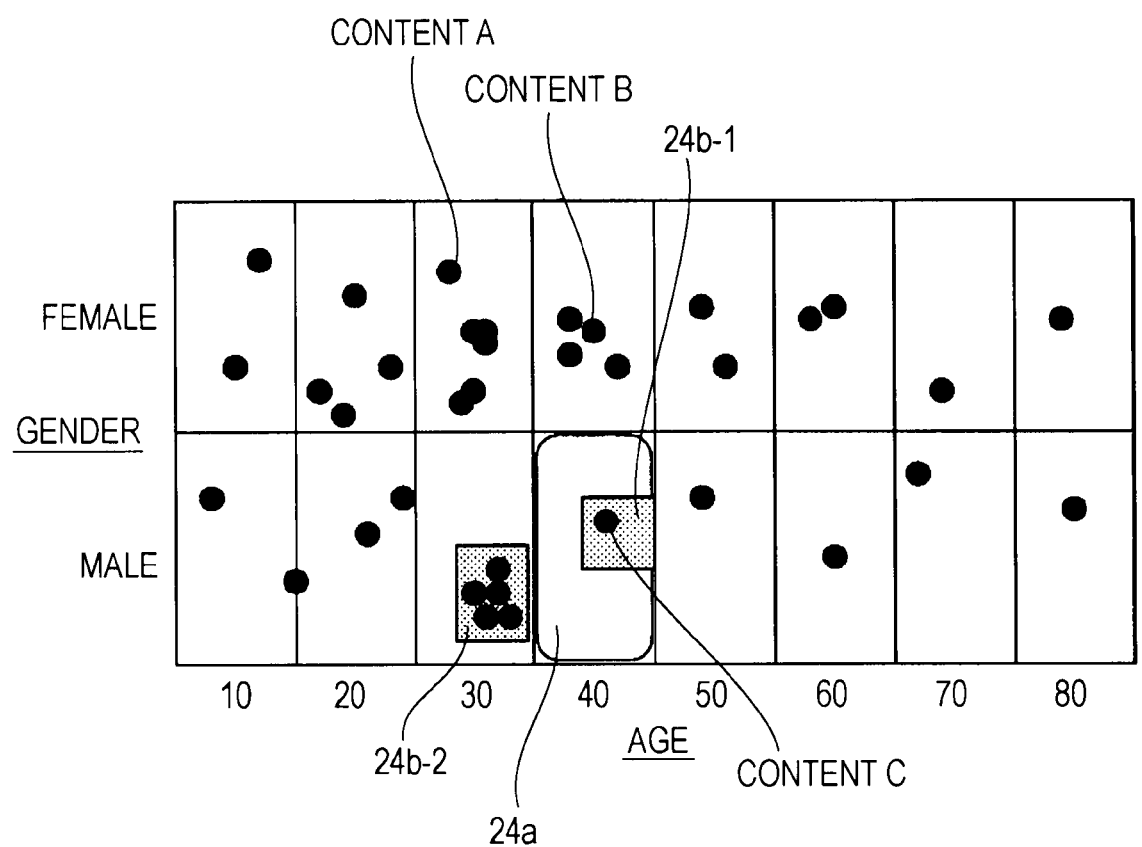
FIG. 3 is a diagram describing user estimation information and profile information.

The relationship between user estimation information and profile information will be described below with reference to FIG. 3. FIG. 3 is a diagram illustrating the relationship between an age (estimated age) of a user and a gender (estimated gender) of the user. For example, when user estimation information 24*a* ("estimated age: 40s" and "estimated gender: male") is obtained from face information of a user, profile information 24*b*-1 is included in the user estimation information 24*a*. The profile information 24*b*-1 is associated with content C. Profile information 24*b*-2, content A, and content B are not included in the user estimation information 24*a*.

A method of specifying content to be recommended for a user (performed only when it is difficult to specify a user) will be described with reference to FIG. 3. (1) First, user estimation information for a user who is trying to reproduce content is obtained with an image recognition technique. In this example, the user estimation information 24*a* (40s, male) is obtained. (2) On the basis of the obtained user estimation information 24*a*, a corresponding area (profile information) is specified in a database. In this example, the profile information 24*b*-1 is obtained. (3) Content associated with the profile information 24*b*-1 is specified as recommended content. In this example, the content C is specified. Like the profile information 24*b*-2, a plurality of pieces of content may be associated with a single piece of profile information.

The recording/transfer management unit 25 is an example of each of a storage unit and a transfer management unit, and stores a broadcast program (content) on the basis of recording reservation information. Furthermore, the recording/transfer management unit 25 manages the transfer of recorded content, content based on a viewing history, and recommended content to a terminal connected to the server 20.

The database unit 26 is an example of a storage unit, and stores many pieces of content data to be transferred which include content data that has been subjected to programmed recording in the recording/transfer management unit 25 and content data recorded in the past. Furthermore, the database unit 26 stores a face image (or face information) of a user which has been obtained at the time of recording reservation or user registration. In the first embodiment, the database unit 26 is used as the above-described user estimation database or the above-described profile information database.

The control unit 27 controls each unit in the server 20, and is, for example, a Micro Processing Unit (MPU.)

[Programmed Recording Process]

A programmed recording process performed by the content transfer system 100 will be described with reference to a flowchart illustrated in FIG. 4. When a user inputs a recording reservation instruction by operating the input unit 11 in the mobile terminal 1, the control unit 19 generates recording reservation information for a broadcast program on the basis of an input signal that has been generated by the input unit 11 in accordance with a user's operation. The user captures the face image of the user with the camera unit 3 in the mobile terminal 1 and stores the face image in the storage unit 18. The face image may be captured at the time of the recording reservation or before the recording reservation. Alternatively, a face image stored in advance in the storage unit 18 may be used. The user connects the mobile terminal 1 to the server 20 so as to transmit the recording reservation information and the face image to the server 20.

The server 20 detects that the data transfer control unit 22 has received the recording reservation information and the face image from the mobile terminal 1 via the communication unit 21 in step S1.

The recording reservation application unit 23 performs face recognition upon the received face image with a face recognition technique in step S2.

The recording reservation application unit 23 determines whether the face recognition has been fully completed (all parts of the face information have been detected) or the face recognition has been only partially completed (only a part of the face information has been detected) in step S3.

When it is determined in step S3 that the face recognition has been fully completed, that is, all parts of the face information have been detected, the recording reservation application unit 23 notifies the recording/transfer management unit 25 of the fact. At that time, the recording reservation application unit 23 associates all parts of the face information and the recording reservation information with each other and transfers them to the recording/transfer management unit 25 in step S4.

The recording/transfer management unit 25 records a broadcast program on the basis of the transferred recording reservation information in step S5. The content data of the recorded broadcast program is associated with the face information and is then stored in the database unit 26. Subsequently, the programmed recording process ends.

On the other hand, when it is determined in step S3 that the face recognition has been only partially completed, that is, only a specific part of the face information has been recognized (for example, one of face parts or a hair style), the recording reservation application unit 23 notifies the user profile unit 24 of the fact and transmits the face information to the user profile unit 24. The user profile unit 24 acquires user estimation information closest to the face information transferred from the recording reservation application unit 23 from a user estimation database (the database unit 26) and transmits the user estimation information to the recording reservation application unit 23 in step S6.

The recording reservation application unit 23 associates the user estimation information transmitted from the user profile unit 24 and the recording reservation information with each other and transfers them to the recording/transfer management unit 25 in step S7.

The recording/transfer management unit 25 records a broadcast program on the basis of the transferred recording reservation information in step S8. The content data of the recorded broadcast program is associated with the user estimation information and is then stored in the database unit 26. Subsequently, the programmed recording process ends.

[Content Transfer Process]

A content transfer process performed by the content transfer system 100 will be described with reference to a flowchart illustrated in FIG. 5.

The server 20 determines whether the data transfer control unit 22 is connected to the mobile terminal 1 via the communication unit 21 in step S11. When the mobile terminal 1 is connected to the server 20, the server 20 requests the mobile terminal 1 to transmit a face image.

When a user checks a face image transmission request message displayed on the display unit 2 in the mobile terminal 1, the user captures the face image of the user with the camera unit 3 or prepares the face image of the user captured in the past. The control unit 19 in the mobile terminal 1 transmits the face image to the server 20 via the radio communication unit 17. The server 20 acquires the face image transmitted from the mobile terminal 1 in step S12.

The recording/transfer management unit 25 in the server 20 performs face recognition upon the received face image in step S13.

The recording/transfer management unit 25 determines whether the face recognition has been fully completed (all parts of the face information have been detected) or the face recognition has been only partially completed (only a part of the face information has been detected) in step S14.

When it is determined in step S14 that the face recognition has been fully completed, the recording/transfer management unit 25 compares the face information of the received face image with the face information of a face image obtained at the time of recording reservation so as to specify a user in step S15. Alternatively, the recording/transfer management unit 25 may compare the face information of the received face image with the face information of a registered face image so as to specify a user.

The recording/transfer management unit 25 selects the content data of a broadcast program for which the specified user has made a recording reservation from among many pieces of content data stored in the database unit 26 in step S16.

On the other hand, when it is determined in step S14 that the face recognition has been only partially completed, the user profile unit 24 compares a part of the face information of the received face image with the face information (or a part of the face information) of a face image obtained at the time of recording reservation and acquires user estimation information associated with the matched part of the face information from the database unit 26 in step S17. Alternatively, the user profile unit 24 may compare a part of the face information of the received face image with the face information of a registered face image and acquire user estimation information associated with the matched part of the face information from the database unit 26.

The user profile unit 24 specifies corresponding profile information in the profile information database (the database unit 26) on the basis of the acquired user estimation information in step S18.

The recording/transfer management unit 25 selects content data associated with the specified profile information from among many pieces of content data stored in the database unit 26 as recommended content in step S19.

The recording/transfer management unit 25 transfers the content data selected in step S16 or S19 to the mobile terminal 1 via the communication unit 21 in step S20. Subsequently, the process ends.

In this example, when the mobile terminal 1 is connected to the server 20 in step S11, the server 20 requests the mobile terminal 1 to transmit a face image. However, for example, the mobile terminal 1 may transmit a face image to the server 20 when the mobile terminal 1 is connected to the server 20 (the mobile terminal 1 transmits a content transfer request to the server 20.) In this example, content data is digital data. However, content data may be analog data.

[Effect of First Embodiment]

In the first embodiment, the mobile terminal 1 transmits recording reservation information and a face image to the server 20. The server 20 performs face recognition upon the face image, associates a result (face information) of the face recognition and the recording reservation information with each other, and performs programmed recording. When user registration has yet to be performed, a user transmits a face image to the server 20 for user registration. When the server 20 transfers content data that has been subjected to programmed recording to the mobile terminal 1, the server 20 acquires the face image of the user from the mobile terminal 1, performs face recognition upon the acquired face image, compares face information of the user with the face information of the user obtained at the time of recording reservation or the registered face information of the user, and specifies the user of the mobile terminal 1. When the server 20 recognizes only a part of the face information, the server 20 acquires user estimation information corresponding to a part of user information acquired at the time of recording reservation or registered user information instead of specifying a user.

Accordingly, it is possible to transfer content data corresponding to the hobby and preference of each user of the mobile terminal 1 without misidentifying the user. Even when a single mobile terminal is shared among a plurality of users, it is possible to automatically transfer content data corresponding to the hobby and preference of each of the users.

In particular, when face information of a user is transmitted to an external apparatus along with recording reservation information at the time of recording reservation, it is possible to automatically transfer content corresponding to the hobby and preference of the user even before user registration.

If the information processing power of a mobile terminal is low, it is possible to reduce the load of information processing on the mobile terminal by providing a face recognition function for a server as described previously.

Figure 4:
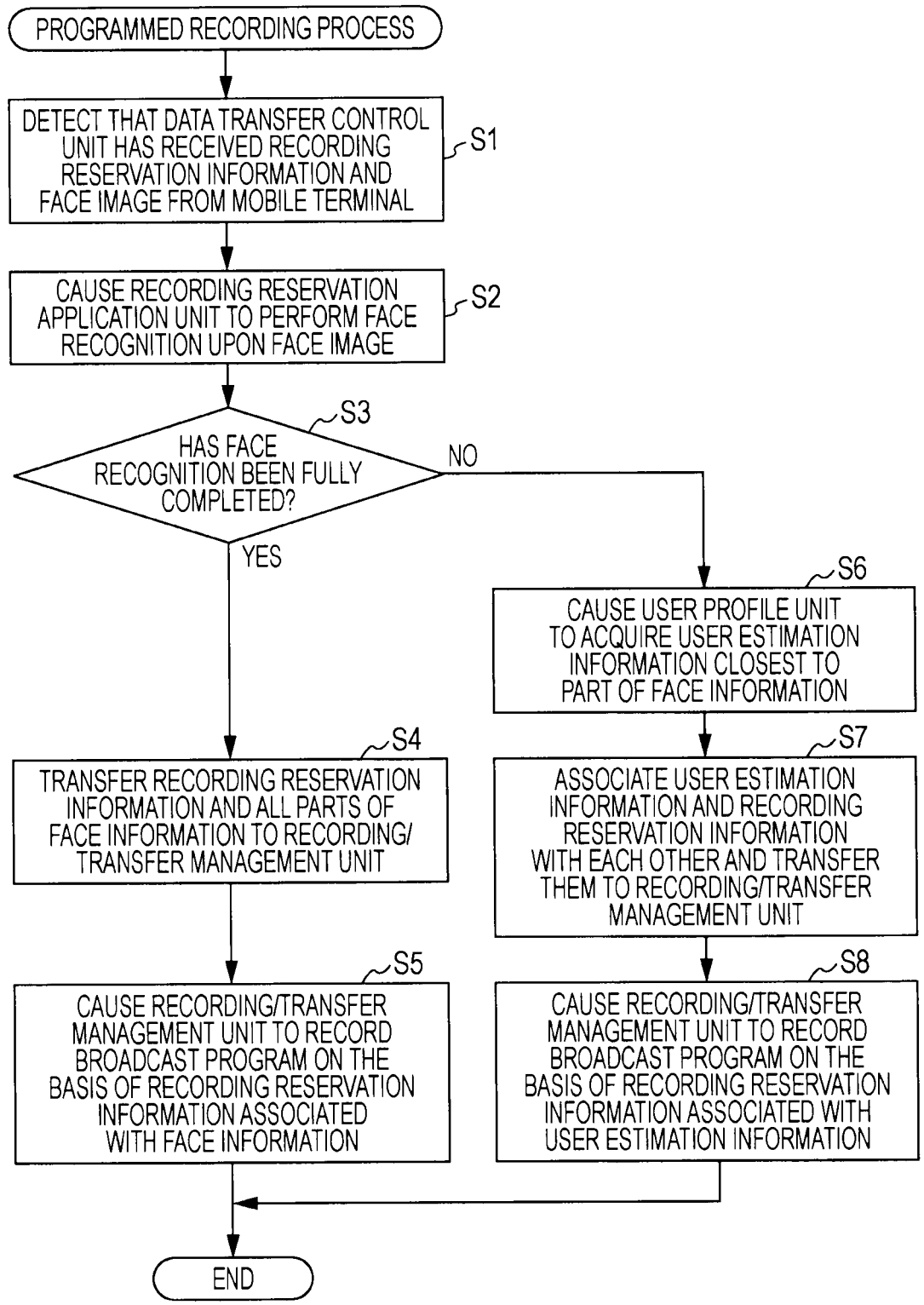
FIG. 4 is a flowchart illustrating a programmed recording process according to the first embodiment.
Figure 5:
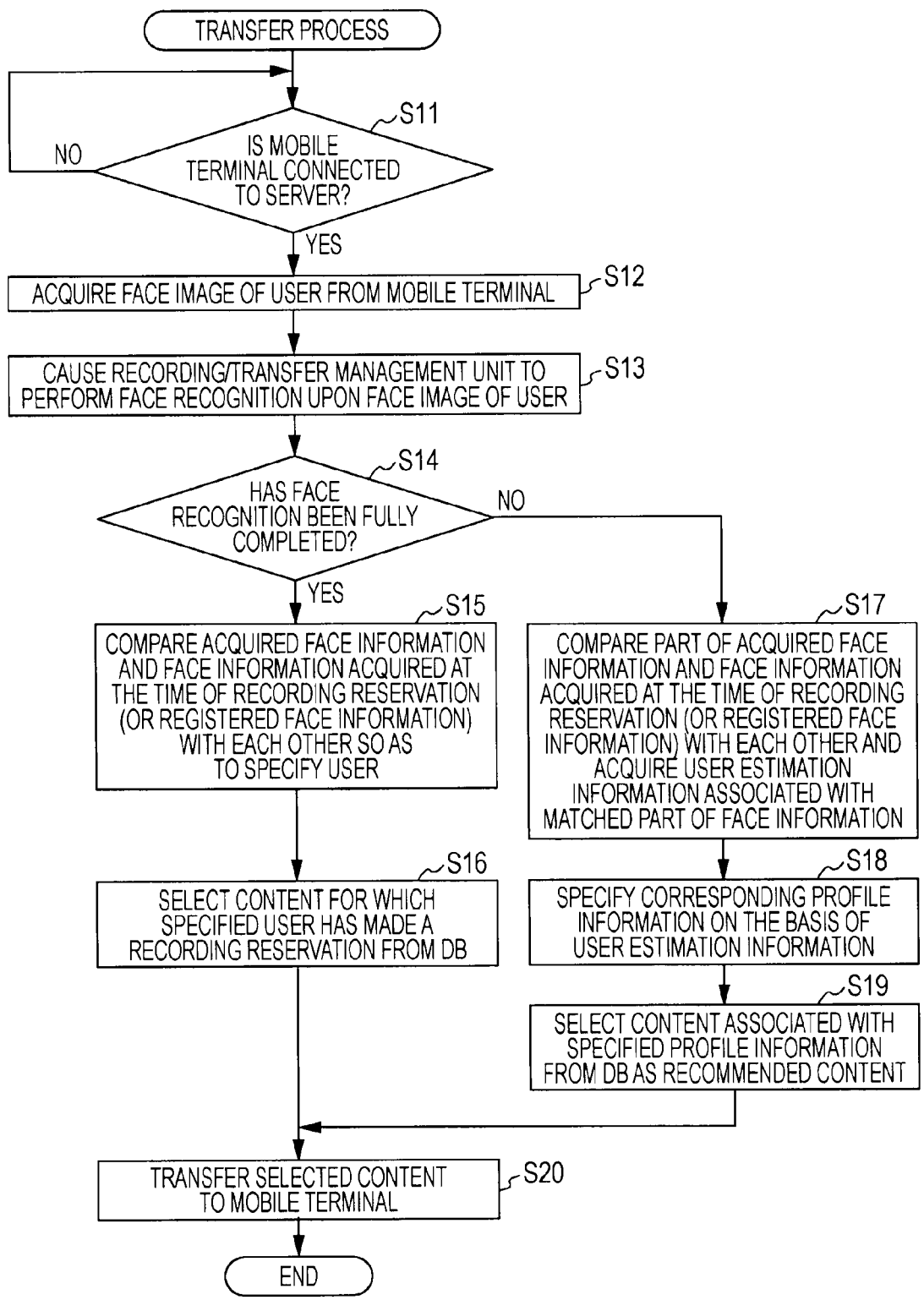
FIG. 5 is a flowchart illustrating a content transfer process according to the first embodiment.

In the exemplary processes illustrated in FIG. 4 (the programmed recording process) and FIG. 5 (the content transfer process), the recording reservation application unit 23 and the recording/transfer management unit 25 perform face recognition. However, in the content transfer process illustrated in FIG. 5, the recording reservation application unit 23 may perform face recognition and notify the recording/transfer management unit 25 of a result of the face recognition. Alternatively, the control unit 27 may perform face recognition and notify the recording reservation application unit 23 or the recording/transfer management unit 25 of a result of the face recognition.

<2. Second Embodiment>

In a content transfer system according to the second embodiment, the recording reservation application unit 23 in the server 20 in the content transfer system 100 according to the first embodiment is disposed in the mobile terminal 1. That is, a mobile terminal performs face recognition at the time of recording reservation. Like in the first embodiment, in the second embodiment, in order to allow a mobile terminal to receive from a server content other than content that has been subjected to programmed recording, the face image of a user is transmitted from the mobile terminal to the server for user registration before the transfer of content.

[Internal Configuration of Mobile Terminal and Server]

Figure 6:
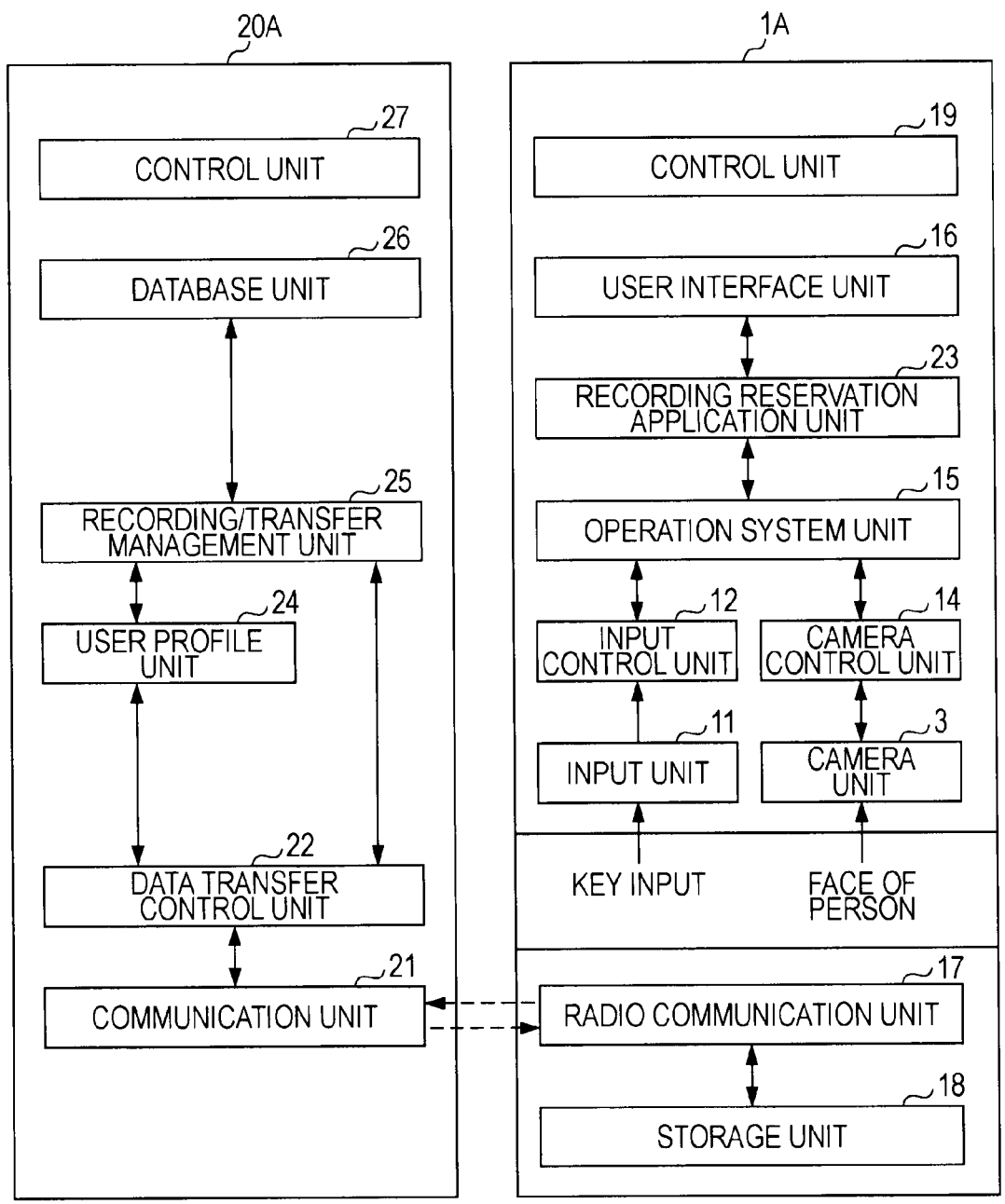
FIG. 6 is a block diagram illustrating the internal configurations of a mobile terminal and a server which are included in a content transfer system according to a second embodiment of the present invention.

FIG. 6 is a block diagram illustrating the internal configurations of a mobile terminal and a server which are included in a content transfer system 100A according to the second embodiment. In FIG. 6, the same reference numerals are used to identify parts already described with reference to FIG. 2, and the detailed descriptions thereof will be therefore omitted.

First, the internal configuration of a mobile terminal 1A will be described. The mobile terminal 1A has an input function and a camera function, and includes the operation system unit 15, the recording reservation application unit 23, the user interface unit 16, the radio communication unit 17, the storage unit 18, and the control unit 19.

The recording reservation application unit 23 performs recording reservation on the basis of recording reservation information for a broadcast program which has been created in accordance with a user's operation, and performs user authentication upon face data with a face recognition function. When all parts of face information of a user are detected at the time of user authentication, the recording reservation application unit 23 notifies a server 20A of the fact via the radio communication unit 17. On the other hand, when only a part of the face information of the user is detected, the recording reservation application unit 23 notifies the server 20A of the fact via the radio communication unit 17. When recording reservation is not performed, the recording reservation application unit 23 does not operate.

Next, the internal configuration of the server 20A will be described. The server 20A includes the communication unit 21, the data transfer control unit 22, the user profile unit 24, the recording/transfer management unit 25, the database unit 26, and the control unit 27.

The data transfer control unit 22 controls the data transfer between the server 20A and the mobile terminal 1A. For example, the data transfer control unit 22 determines whether a connection request, recording reservation information, or a content transfer request has been transmitted to the server 20A. The data transfer control unit 22 transmits face data, recording reservation information, or a content transfer request which has been received by the communication unit 21 to the recording/transfer management unit 25 or the user profile unit 24. Furthermore, the data transfer control unit 22 transmits content transferred from the recording/transfer management unit 25 to the communication unit 21.

[Programmed Recording Process]

A programmed recording process performed by the content transfer system 100A will be described with reference to a flowchart illustrated in FIG. 7. A user captures the face image of the user using the camera unit 3 in the mobile terminal 1A and stores the face image in the storage unit 18 in step S21. When a user inputs a recording reservation instruction by operating the input unit 11 in the mobile terminal 1A, the control unit 19 controls the recording reservation application unit 23 so that recording reservation information for a broadcast program is generated on the basis of an input signal generated by the input unit 11 in accordance with a user's operation in step S22.

The face image may be captured at the time of recording reservation or before the recording reservation. Alternatively, a face image stored in advance in the storage unit 18 may be used.

The recording reservation application unit 23 performs face recognition upon the face image in step S23. The recording reservation application unit 23 determines whether the face recognition has been fully completed (all parts of the face information have been detected) or the face recognition has been only partially completed (only a part of the face information has been detected) in step S24.

When it is determined in step S24 that the face recognition has been fully completed, the recording reservation application unit 23 notifies the server 20A of the fact via the radio communication unit 17. At that time, the recording reservation application unit 23 associates all parts of the face information and the recording reservation information with each other and transmits them to the server 20A in step S25.

The data transfer control unit 22 in the server 20A detects that the face information and the recording reservation information have been transmitted from the mobile terminal 1A via the communication unit 21, and notifies the recording/transfer management unit 25 of the fact. The recording/transfer management unit 25 records a broadcast program on the basis of the transferred recording reservation information in step S26. The content data of the recorded broadcast program is associated with the face information and is then stored in the database unit 26. Subsequently, the programmed recording process ends.

On the other hand, when it is determined in step S24 that the face recognition has been only partially completed, the recording reservation application unit 23 notifies the server 20A of the fact via the radio communication unit 17. At that time, the recording reservation application unit 23 associates a part of the face information and the recording reservation information with each other and transmits them to the server 20A in step S27.

The data transfer control unit 22 in the server 20A detects that a part of the face information and the recording reservation information have been transmitted from the mobile terminal 1A via the communication unit 21, and notifies the user profile unit 24 of the fact. The user profile unit 24 acquires user estimation information closest to the part of the face information transferred from the data transfer control unit 22 from the user estimation database (the database unit 26) and transmits the user estimation information to the data transfer control unit 22 in step S28.

The data transfer control unit 22 associates the user estimation information transmitted from the user profile unit 24 with the recording reservation information and transfers them to the recording/transfer management unit 25 in step S29.

The recording/transfer management unit 25 records a broadcast program on the basis of the transferred recording reservation information in step S30. The content data of the recorded broadcast program is associated with the user estimation information and is then stored in the database unit 26. Subsequently, the programmed recording process ends.

A process of transferring a broadcast program (content data) that has been subjected to programmed recording is the same as that performed in the content transfer system 100 according to the first embodiment, and the description thereof will be therefore omitted.

[Effect of Second Embodiment]

In the second embodiment, the mobile terminal 1A creates recording reservation information, performs face recognition upon the face image of a user, and transmits the recording reservation information and a result (face information) of the face recognition to the server 20A. The server 20A associates the result of the face recognition and the recording reservation information with each other and performs programmed recording. When user registration has yet to be performed, a user transmits a face image to the server 20A for user registration. When the server 20A transfers content data that has been subjected to programmed recording to the mobile terminal 1A, the server 20A acquires the face image of a user from the mobile terminal 1A, performs face recognition upon the acquired face image, compares face information of the user with the face information of a user obtained at the time of recording reservation or the registered face information of the user, and specifies the user of the mobile terminal 1A. When the server 20A recognizes only a part of the face information, the server 20A acquires user estimation information corresponding to a part of the user information acquired at the time of recording reservation or the registered user information instead of specifying a user.

Accordingly, it is possible to transfer content data corresponding to the hobby and preference of each user of the mobile terminal 1A without misidentifying the user. Even when a single mobile terminal is shared among a plurality of users, it is possible to automatically transfer content data corresponding to the hobby and preference of each of the users.

If the information processing power of a mobile terminal is high, it is possible to reduce the load of information processing on a server connected to a plurality of mobile terminals as compared with the first embodiment by providing a face recognition function for the mobile terminal as described previously.

In the second embodiment, an operational effect similar to that obtained in the first embodiment can be obtained.

Figure 7:
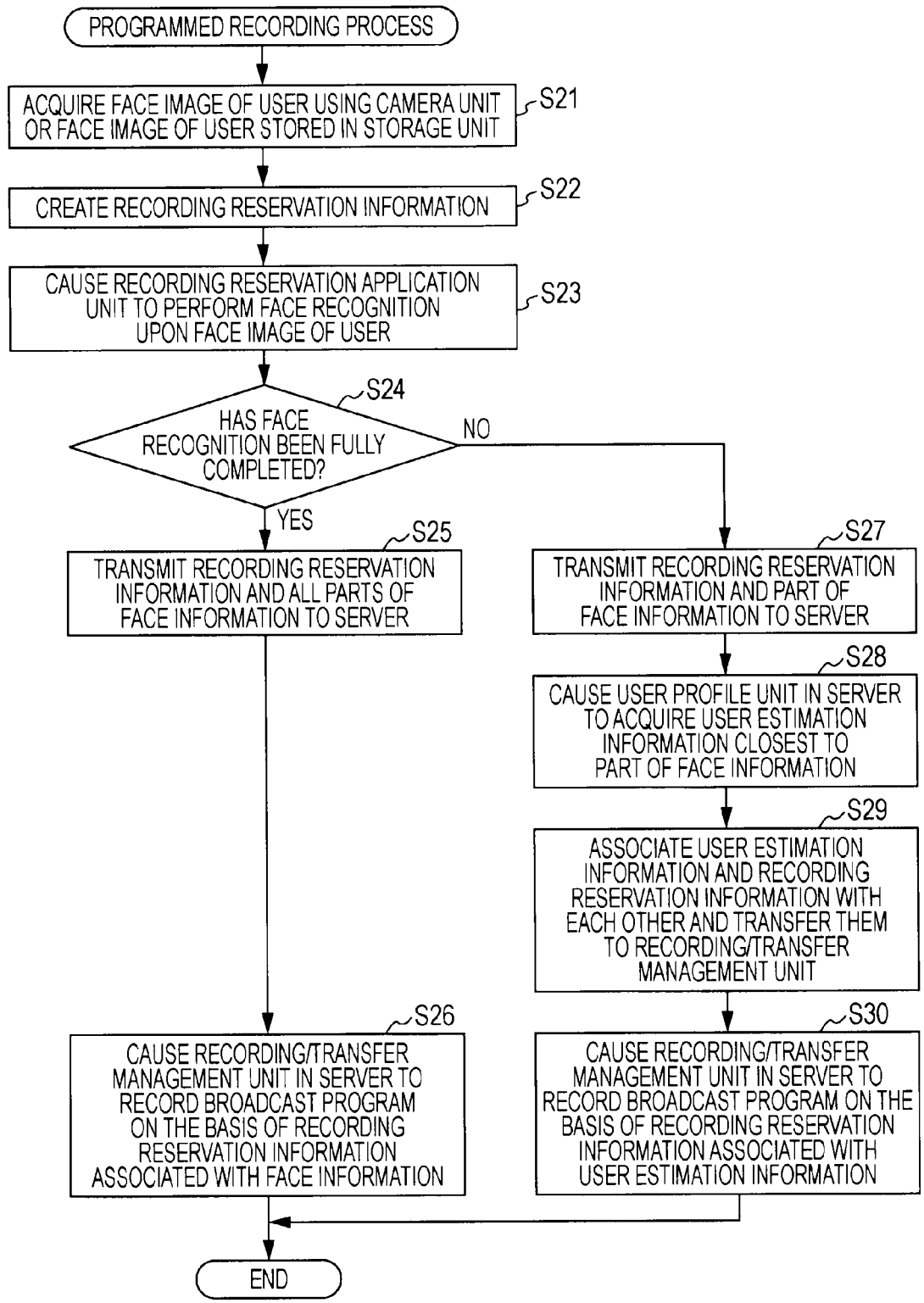
FIG. 7 is a flowchart illustrating a programmed recording process according to the second embodiment.

In an exemplary process illustrated in FIG. 7 (the programmed recording process), the recording reservation application unit 23 performs face recognition. However, the control unit 27 may perform face recognition and notify the recording reservation application unit 23 of a result of the face recognition.

<3. Third Embodiment>
[Overview of Content Transfer System]

A content transfer system according to the third embodiment uses a recording apparatus instead of a server that has a recording function and is used as an external apparatus in the content transfer system 100A according to the second embodiment. In the recording apparatus, a recording function and a user profile function are separated from each other. The user profile function is provided for a server. Like in the above-described embodiments, in the third embodiment, in order to allow a mobile terminal to receive from a server content other than content that has been subjected to programmed recording, the face image of a user is transmitted from the mobile terminal to the server for user registration before the transfer of content.

[Entire Configuration of Content Transfer System]

Figure 8:
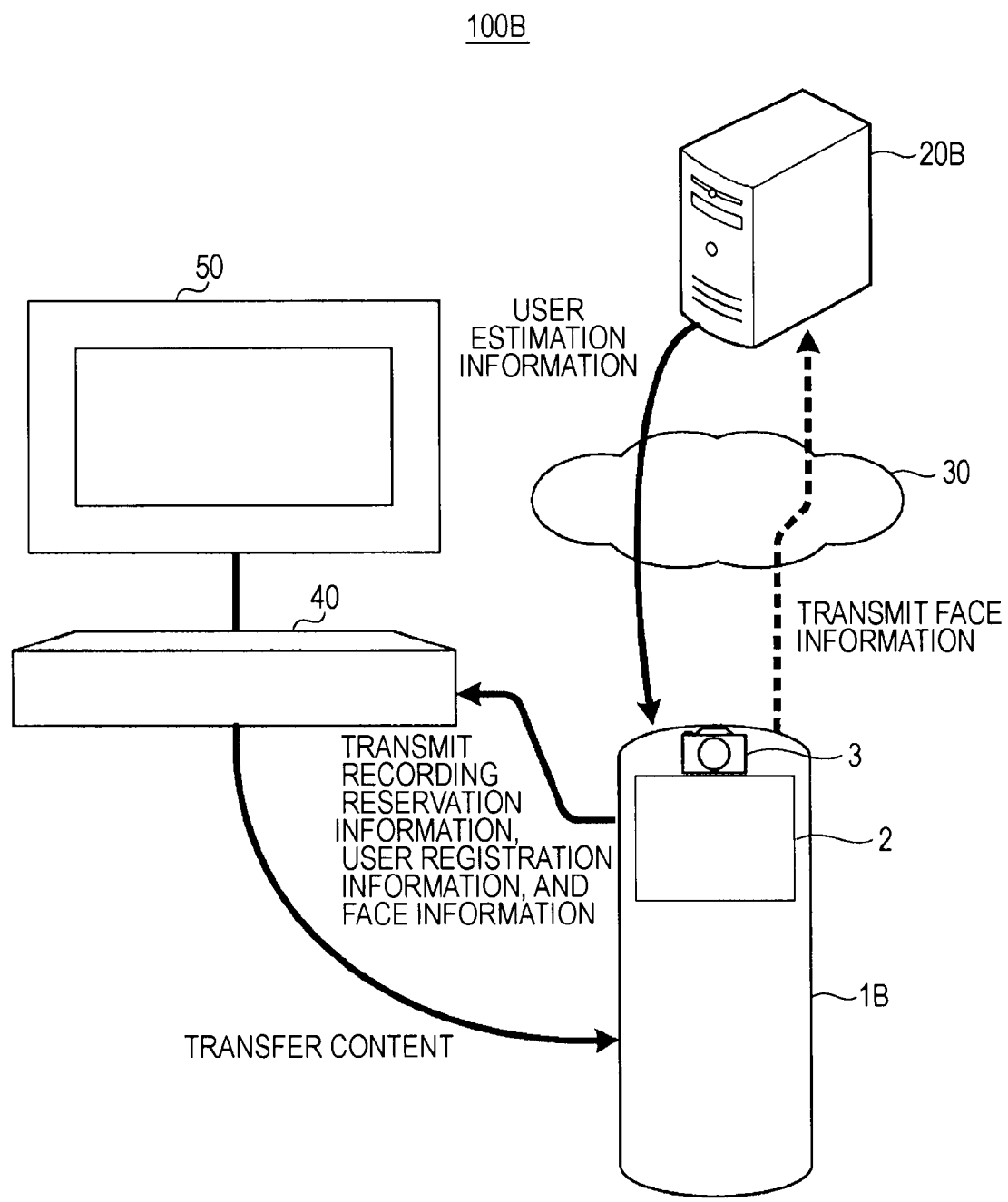
FIG. 8 is a diagram illustrating the entire configuration of a content transfer system according to a third embodiment of the present invention.

FIG. 8 is a diagram illustrating the entire configuration of a content transfer system according to the third embodiment. In FIG. 8, the same reference numerals are used to identify parts already described with reference to FIG. 1, and the detailed descriptions thereof will be therefore omitted. A content transfer system 100B includes a mobile terminal 1B having a camera function, a server 20B, and a recording apparatus 40 such as a hard disk recorder. A television receiver 50 is connected to the recording apparatus 40. The mobile terminal 1B and the recording apparatus 40 are connected so that they can perform data communicate with each other using a wireless LAN or the Near Field Communication technology.

[Internal Configuration of Mobile Terminal and Server]

Figure 9:
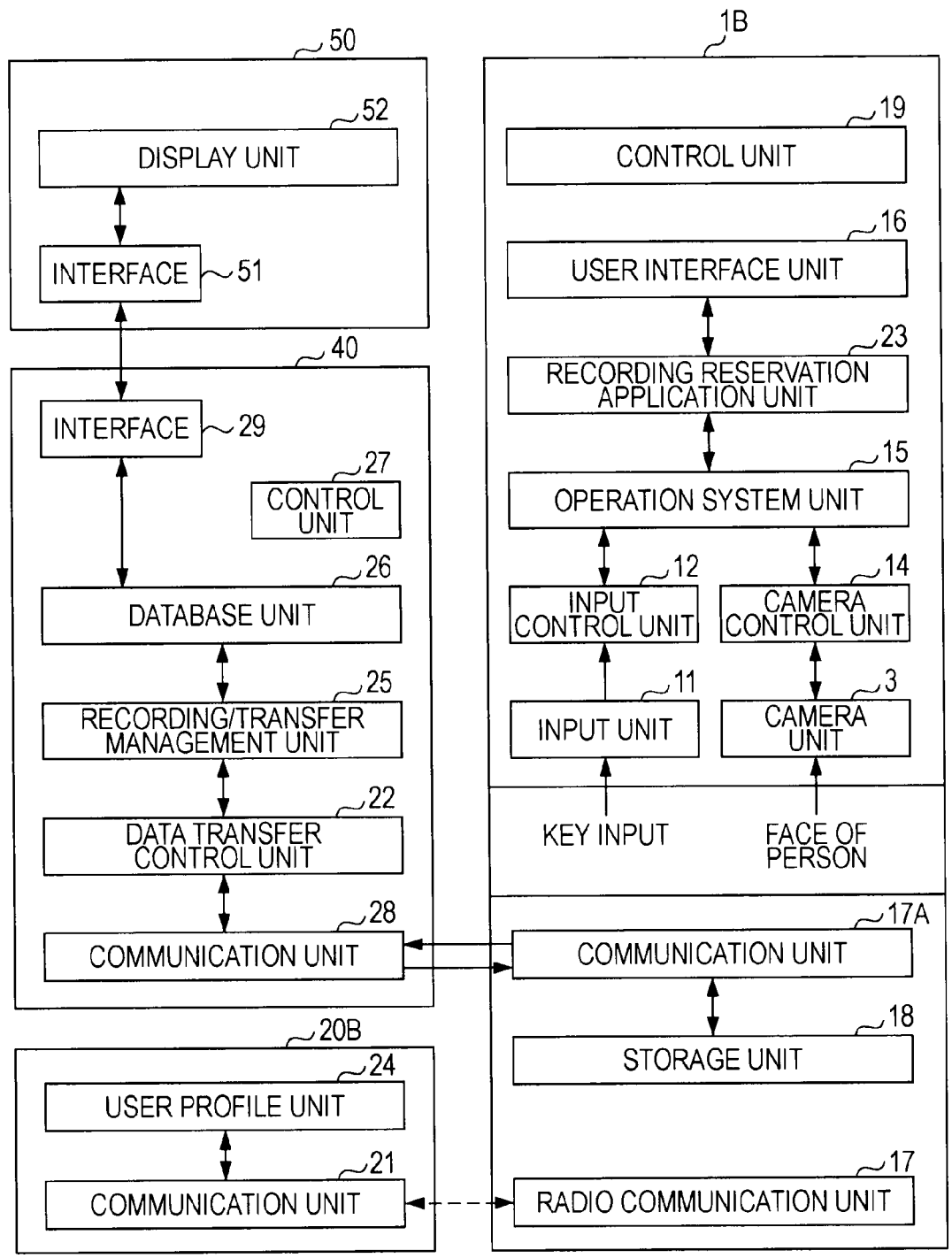
FIG. 9 is a block diagram illustrating the internal configurations of a mobile terminal according to the third embodiment and a server according to the third embodiment.

FIG. 9 is a block diagram illustrating the internal configurations of the mobile terminal 1B, the server 20B, the recording apparatus 40, and the television receiver 50. In FIG. 9, the same reference numerals are used to identify parts already described with reference to FIGS. 2 and 6, and the detailed descriptions thereof will be therefore omitted.

First, the internal configuration of the mobile terminal 1B will be described. The mobile terminal 1B has an input function and a camera function, and includes the operation system unit 15, the recording reservation application unit 23, the user interface unit 16, the radio communication unit 17, the storage unit 18, the control unit 19, and a communication unit 17A.

The communication unit 17A performs data communication with the recording apparatus 40, and uses a communication standard such as Universal Serial Bus (USB), Wi-Fi (registered trademark), or Bluetooth (registered trademark.)

Next, the internal configuration of the server 20B will be described. The server 20B includes the communication unit 21 and the user profile unit 24. The user profile unit 24 selects user estimation information closest to a part of the face information of a user transmitted from the mobile terminal 1B from among pieces of profile information stored in a database unit (not illustrated) and transmits the user estimation information to the mobile terminal 1B.

Next, the internal configuration of the recording apparatus 40 will be described. The recording apparatus 40 includes a communication unit 28, the data transfer control unit 22, the recording/transfer management unit 25, the database unit 26, the control unit 27, and an interface 29.

The communication unit 28 performs data communication with the mobile terminal 1B, and uses a communication standard such as Universal Serial Bus (USB), Wi-Fi (registered trademark), or Bluetooth (registered trademark.) The interface 29 performs data communication with a display apparatus such as the television receiver 50, and is, for example, the High-Definition Multimedia Interface (HDMI.)

The television receiver 50 includes an interface 51 for receiving content data from the recording apparatus 40. Content data received by the interface 51 is transmitted to a display unit 52 and is then displayed on a screen.

[Programmed Recording Process]

A programmed recording process performed by the content transfer system 100B will be described with reference to a flowchart illustrated in FIG. 10. The process from step S31 to step S40 is the same as the process from step S21 to step S30 (see FIG. 7) except for the following.

In step S25 illustrated in FIG. 7, when it is determined that face recognition has been fully completed, the recording reservation application unit 23 in the mobile terminal 1A associates all parts of face information and recording reservation information with each other and transmits them and the fact that face recognition has been fully completed to the server 20A via the radio communication unit 17. However, in the third embodiment, when it is determined in step S34 that face recognition has been fully completed, the recording reservation application unit 23 in the mobile terminal 1B associates all parts of face information and recording reservation information with each other and transmits them and the fact that face recognition has been fully completed not to a server but to the recording apparatus 40 via the communication unit 17A in step S35.

The data transfer control unit 22 in the recording apparatus 40 detects that the face information and the recording reservation information have been transmitted from the mobile terminal 1B via the communication unit 28, and notifies the recording/transfer management unit 25 of the fact. The recording/transfer management unit 25 records a broadcast program on the basis of the transferred recording reservation information in step S36. The content data of the recorded broadcast program is associated with the face information and is then stored in the database unit 26. Subsequently, the programmed recording process ends.

On the other hand, when it is determined in step S34 that face recognition has been only partially completed, the recording reservation application unit 23 in the mobile terminal 1B transmits a part of face information and the fact that face recognition has been only partially completed to the server 20B via the radio communication unit 17 in step S37.

The user profile unit 24 in the server 20B acquires user estimation information closest to the part of the face information received via the communication unit 21 from the user estimation database (the database unit 26) and transmits the user estimation information to the mobile terminal 1B in step S38.

The recording reservation application unit 23 in the mobile terminal 1B associates the user estimation information received from the server 20B with the recording reservation information and transfers them to the recording apparatus 40 in step S39.

The data transfer control unit 22 in the recording apparatus 40 detects that the user estimation information and the recording reservation information have been transmitted from the mobile terminal 1B via the communication unit 28 and transfers them to the recording/transfer management unit 25. The recording/transfer management unit 25 records a broadcast program on the basis of the transferred recording reservation information in step S40. The content data of the recorded broadcast program is associated with the user estimation information and is then stored in the database unit 26. Subsequently, the programmed recording process ends.

A process of transferring a broadcast program (content data) that has been subjected to programmed recording is the same as that according to the first and second embodiments, and the description thereof will be therefore omitted.

[Effect of Third Embodiment]

In the third embodiment, the mobile terminal 1B creates recording reservation information, performs face recognition upon the face image of a user, and transmits the recording reservation information and a result (face information) of the face recognition to the recording apparatus 40. At that time, when the face recognition has been only partially completed, the mobile terminal 1B accesses the server 20B so as to acquire user estimation information for the target face image and transmits the acquired user estimation information to the recording apparatus 40. The recording apparatus 40 performs programmed recording on the basis of the recording reservation information associated with the result of the face recognition. When user registration has yet to be performed, a user transmits a face image to the recording apparatus 40 for user registration. When the recording apparatus 40 transfers content data that has been subjected to programmed recording to the mobile terminal 1B, the recording apparatus 40 acquires the face image of a user from the mobile terminal 1B, performs face recognition upon the acquired face image, compares face information of the user with the face information of a user obtained at the time of recording reservation or the registered face information of the user, and specifies the user of the mobile terminal 1B. When only a part of the face information is recognized, user estimation information corresponding to the part of the face information of the user acquired at the time of recording reservation or the registered face information is acquired instead of specifying a user.

Accordingly, it is possible to transfer content data corresponding to the hobby and preference of each user of the mobile terminal 1B without misidentifying the user. Even when a single mobile terminal is shared among a plurality of users, it is possible to automatically transfer content data corresponding to the hobby and preference of each of the users.

By providing a programmed recording function for the recording apparatus 40 and disposing a user profile unit in a server connected to a plurality of mobile terminals as described previously, it is possible to distribute the load of information processing. Accordingly, as compared with the second embodiment, the load of information processing on the server can be further reduced.

Like in a case where content data is transferred to a mobile terminal, content data may be transferred from the interface 29 in the recording apparatus 40 to the television receiver 50 in accordance with a specific situation of a user. In the television receiver 50, the content data received by the interface 51 is transmitted to the display unit 52. As a result, the user can view the content.

In the third embodiment, an operational effect similar to that obtained in the second embodiment can be obtained.

<4. Others>

Although embodiments of the present invention have been described, the present invention is not limited to the embodiments of the present invention. It should be understood by those skilled in the art that various modifications, combinations, sub-combinations and alterations may occur depending on design requirements and other factors insofar as they are within the scope of the appended claims or the equivalents thereof.

For example, in the embodiments of the present invention, a communication terminal (for example, a mobile terminal) that has performed recording reservation or user registration receives content data from an external apparatus. However, a communication terminal that has performed recording reservation or user registration does not necessarily receive content data from an external apparatus. Another communication terminal may receive the content data from the external apparatus insofar as the same user uses these communication terminals (the face images of users of these communication terminals are the same.) Accordingly, a communication terminal for performing recording reservation and user registration and a communication terminal to which content is transferred may be different from each other.

In the embodiments of the present invention, a mobile terminal is used as a communication terminal for making a recording reservation. However, a stationary communication terminal may be used. A camera function may be provided not for a communication terminal but for a recording apparatus or a display apparatus such as a television receiver.

In the embodiments of the present invention, user identification (user authentication) is performed with a result of face recognition performed upon a face image at the time of recording reservation or content transfer. Instead of face recognition, a biometric authentication technique enabling personal identification, for example, fingerprint authentication, iris authentication, voice print authentication, body temperature authentication, heart rate authentication, or blood pressure authentication, may performed. Like in the embodiments of the present invention, when biometric authentication has been completed (all parts of authentication information have been obtained), the authentication information is used to determine whether content can be transferred to a communication terminal. When biometric authentication has been partially completed (only a part of authentication information has been obtained), user estimation information corresponding to the part of the authentication information is used to determine whether content can be transferred to a communication terminal.

Each of the functions of a mobile terminal, a server, and a recording apparatus according to an embodiment of the present invention may be achieved by a piece of hardware, software, or the combination of a pieces of hardware and software.

In this specification, the steps do not have to be executed in chronological order described above. The steps may be concurrently or individually (the steps may include, for example, parallel processing or object processing.)

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal comprising:
   an interface configured to receive an input from a user requesting a reservation to record content, the reservation to record content based on content preferences included in the input;
   circuitry configured to
      acquire first image data corresponding to a face of the user of the communication terminal;
      generate recording reservation information based on the content preferences included in the input;
      transmit, to a server, the recording reservation information and the first image data together, the server recording the content based on the recording reservation information, and the server associating the recorded content with at least one attribute of the user estimated by analyzing the first image data in the server;

transmit, to the server, second image data corresponding to the face of the user; and receive, from the server, the recorded content that corresponds to the second image data, the recorded content being identified based on at least one attribute of the user estimated by analyzing the second image data.

2. The communication terminal of claim 1, further comprising:

a camera configured to capture the first image data corresponding to the user, which is acquired by the circuitry.

3. The communication terminal of claim 1, further comprising:

a memory configured to store the first image data corresponding to the user, which is acquired by the circuitry.

4. The communication terminal of claim 1, wherein the circuitry is configured to perform facial recognition on the first image data; and extract a characteristic parameter from the first image data based on the facial recognition performed on the first image data.

5. The communication terminal of claim 4, wherein the circuitry is configured to determine whether all parts of face information have been detected by the facial recognition.

6. The communication terminal of claim 5, wherein the circuitry is configured to transmit all parts of the face information with the recording reservation information when it is determined that all parts of the face information have been detected by the facial recognition.

7. The communication terminal of claim 5, wherein the circuitry is configured to transmit only a part of the face information with the recording reservation information when it is determined that only a part of the face information has been detected by the facial recognition.

8. A non-transitory computer-readable medium including computer program code, which when executed by a communication terminal, causes the communication terminal to perform a method comprising:

receiving an input from a user requesting a reservation to record content, the reservation to record content based on content preferences included in the input;

acquiring first image data corresponding to a face of the user of the communication terminal;

generating recording reservation information based on the content preferences included in the input;

transmitting, to a server, the recording reservation information and the first image data together, the server recording the content based on the recording reservation information, and the server associating the recorded content with at least one attribute of the user estimated by analyzing the first image data in the server;

transmitting, to the server, second image data corresponding to the face of the user; and receiving, from the server, the recorded content that corresponds to the second image data, the recorded content being identified based on at least one attribute of the user estimated by analyzing the second image data.

9. The non-transitory computer-readable medium of claim 8, further comprising:

performing facial recognition on the first image data; and extracting a characteristic parameter from the first image data based on the facial recognition performed on the first image data.

10. The non-transitory computer-readable medium of claim 9, further comprising:

determining whether all parts of face information have been detected by the facial recognition.

11. The non-transitory computer-readable recording medium of claim 10, further comprising:

transmitting all parts of the face information with the recording reservation information when it is determined that all parts of the face information have been detected; and transmitting only a part of the face information with the recording reservation information when it is determined that only a part of the face information has been detected.

12. A server comprising:

circuitry configured to receive, from a communication terminal, recording reservation information and first image data together, the recording reservation information being based on content preferences included in an input of a user, and the first image data corresponding to a face of the user;

record content based on the recording reservation information;

associate the recorded content with at least one attribute of the user estimated by analyzing the first image data in the server;

receive second image data corresponding to the face of the user acquired by the communication terminal;

estimate at least one attribute of the user by analyzing the second image data;

identify content to be transferred to the communication terminal based on the estimated at least one attribute of the user and the at least one attribute obtained from the first image data; and transmit the identified content to the communication terminal.

13. The server of claim 12, wherein the second image data corresponding to the face of the user who has not previously registered face information at the server.

14. The server of claim 13, wherein the circuitry is configured to perform facial recognition on the second image data and compare the second image data to stored image data to estimate the at least one attribute of the user.

15. The server of claim 12, wherein the circuitry is configured to generate an estimated user profile based on the received second image data and the content preferences corresponding to the user.

16. The server of claim 15, wherein the circuitry is configured to identify content to be transferred to the communication terminal based on the estimated user profile.

17. The server of claim 12, wherein the circuitry is configured to identify the recorded content as the identified content.

18. A non-transitory computer-readable medium including computer program code, which when executed by a server, causes the server to perform a method comprising:

receiving, from a communication terminal, recording reservation information and first image data together, the recording reservation information being based on content preferences included in an input of a user, and the first image data corresponding to a face of the user;
recording content based on the recording reservation information;
associate the recorded content with at least one attribute of the user estimated by analyzing the first image data in the server;
receiving second image data corresponding to the face of the user acquired by the communication terminal;
estimating at least one attribute of the user by analyzing the second image data;
identifying content to be transferred to the communication terminal based on the estimated at least one attribute of the user and the at least one attribute obtained from the first image; and
transmitting the identified content to the communication terminal.

19. The non-transitory computer-readable medium of claim 18, further comprising:
performing facial recognition on the second image data; and
comparing a result of the facial recognition to stored image data to estimate the at least one attribute of the user.

20. The non-transitory computer-readable medium of claim 18, further comprising:
generating an estimated user profile based on the received second image data and content preferences corresponding to the user; and
identifying the content to be transferred to the communication terminal based on the estimated user profile.

21. The communication terminal of claim 1, wherein
the first image data and the second image data include the same image data.

* * * * *